Patented Aug. 2, 1932

1,869,454

UNITED STATES PATENT OFFICE

SERGE WITTOUCK, OF PARIS, FRANCE, ASSIGNOR TO INTERNATIONAL INDUSTRIAL AND CHEMICAL COMPANY, LIMITED, OF MONTREAL, QUEBEC, CANADA

MANUFACTURE OF BARIUM COMPOUNDS

No Drawing. Application filed February 27, 1929, Serial No. 343,241, and in Great Britain March 3, 1928.

This invention relates to and has for its object the provision of an improved process or processes for the manufacture of barium silicates including dibarium silicate and other silicates rich in barium, or other mixtures or compounds of barium silicate with barium oxide. It relates to processes involving calcination and in such processes it is desirable to avoid or substantially minimize fusion of the reaction materials or products and at the same time to avoid introducing foreign matter more especially if pure products are desired and/or if it is desired to be able to effect the calcination efficiently in any kind of furnace or the like without deterioration thereof.

The invention broadly consists in a process of the kind and for the purpose indicated in which fusion is avoided by dilution or dispersion of the starting materials in a medium infusible at the temperatures of calcination, preferably without introduction of matter foreign to said materials or to the reaction products.

The invention further consists in a process as set forth in which the reaction materials are calcined in the presence of a quantity of the same substance as is desired as the final product.

The invention further consists in a process as set forth in either of the two preceding paragraphs in which the infusible medium or diluent is added in such quantities as to render infusible the whole of the mass undergoing calcination.

The invention further consists in a process according to any of the three preceding paragraphs in which a portion of the calcination product is employed for mixing with other materials to be calcined.

The invention further consists in a process as indicated in the preceding paragraph in which the quantity of calcined product retained corresponds with the reaction products, the remainder being employed as the infusible medium for the subsequent calcination whereby continuity of the process is ensured.

The invention also consists in the recovery of by-products of the calcination such as sulphur or sulphuric acid and carbon dioxide or the like.

The invention further consists in improvements in or relating to barium compounds and the manufacture thereof substantially as hereinafter indicated.

In carrying the invention into effect in one convenient form, by way of example, as applied to the manufacture of dibarium silicate, an intimate moist or dry mixture is made of silica and barium sulphate together with a preferably somewhat larger quantity of dibarium silicate. The mass is calcined for a suitable time at temperatures of the order of about 1500° C. As the reaction between the silica and barium sulphate proceeds there is liberated such substances as sulphuric acid, sulphurous acid anhydride and oxygen, all or any of which may if desired be recovered as for the production of sulphur or sulphuric acid. The quantity of infusible dibarium silicate or the like should preferably be such as to render infusible the whole of the mass subjected to the calcination.

The mass removed from the furnace on completion of the reaction comprises substantially entirely dibarium silicate, the silica and barium sulphate having been converted into dibarium silicate, and the only other substance employed, viz., the infusible diluent medium, having been said same silicate. The product is readily pulverized or similarly treated and if desired about one-third part thereof, or other fraction which may substantially correspond to the products from the actual reaction, is retained, the remainder being reutilized as infusible medium during a subsequent calcination on similar lines.

The process may be readily effected in a continuous manner as by employment of rotary or other suitable furnaces or the like. In such a case the two-thirds or other remaining fraction of the calcined product to be used again may be continuously mixed, in the desired proportions, with the raw or starting materials before admission thereof to the calcination treatment.

In one specific example of obtaining dibarium silicate as above the proportions used may be as follows:—

Mixture of $SiO_2 + 2BaSO_4$ _____ 526 parts
Infusible medium, viz $2BaO.SiO_2$ _ 732 parts Alternatively in place of the silica-barium sulphate mixture about 446 parts of a mixture of mono-barium silicate ($BaO.SiO_2$) and barium sulphate may be employed to about 732 parts of dibarium silicate.

When working in accordance with the above specific examples, the division of the product into say three parts and re-employment of two parts as previously indicated will preserve the continuity and efficiency of the process but it will be understood that a greater or a smaller amount of the product may require to be retained so as to correspond as is desirable to the actual reaction products and to permit return of a sufficient amount of the product to ensure preferably complete infusibility of the mass which has subsequently to be calcined.

Tribarium silicate can also be manufactured on similar lines in which case the initial mixture could conveniently comprise in suitable proportions $BaSO_4$ and $SiO_2$ in which case it would be preferable to employ as the infusible medium a quantity of $3BaO.SiO_2$, viz. the same product as finally required. As an alternative to employing as above silica and sulphate mixture, mono-barium silicate and sulphate may for instance be used.

Silicates of barium intermediate of for instance dibarium and tribarium silicates may also be produced as by the employment of the said intermediate silicate as infusible diluent medium for a mixture for instance of silica or mono-barium silicate with barium sulphate in the required proportions.

The reaction may in some cases be effected in the presence of carbon which may conveniently be introduced in solid, elemental or compound form into the mixture to be calcined. In one such example the mixture treated may comprise:—

(a) $SiO_2 + 2BaSO_4 + 2C$, or
(b) $BaO.SiO_2 + BaSO_4 + C$.

Alternatively, if desirable, CO or other similar gas containing carbon may be passed into contact with the mass during the calcination. Recovery of $CO_2$ or carbonic acid gas which may in such cases be evolved simultaneously with the sulphur or sulphur gases may also be effected if desired in any manner.

It is to be understood that the foregoing are only a few examples of how the invention may be carried into effect and that modifications and additions may be made without in any way departing from the spirit of this invention.

I claim:

1. In the manufacture of a barium silicate compound, the method comprising providing a mixture including silicon in oxy-compound form and a compound of barium fusible at a temperature requisite to reaction thereof with silica to form said silicate and calcining said mixture while dispersed in a quantity of said barium silicate compound.

2. In the manufacture of a barium silicate compound, the method comprising providing a mixture containing silicon in oxy-compound form and barium compounded in part at least as a compound fusible at a temperature requisite to reaction thereof with silica to form silicate and calcining said mixture while dispersed in a quantity of said barium silicate compound.

3. In the manufacture of a silicate of higher barium content than mono-barium silicate, the method which consists in providing a mixture containing a barium silicate of lower barium content than the silicate required and a compound of barium fusible at a temperature requisite to reaction thereof with oxy-compound of silicon to form said required silicate and calcining said mixture in the presence of a sufficient quantity of said required barium silicate to inhibit fusion in said calcination.

4. In the manufacture of a barium silicate compound, the method comprising providing a mixture of silicon-oxygen compound with a barium compound fusible at a temperature requisite to reaction thereof with said silicon-oxygen compound, dispersing said mixture in a quantity of said barium silicate compound, calcining it, retaining a quantity of the calcined product corresponding to the silicate formed in said calcination and mixing the remainder with further quantities of said silicon-oxygen compound and said fusible barium compound.

5. In the manufacture of dibarium silicate, the method which consists in providing a mixture containing a silicon-oxygen compound and barium compounded at least in part as sulphate, dispersing said mixture in a quantity of preformed dibarium silicate and calcining.

6. In the manufacture of dibarium silicate, the method which consists in providing a mixture consisting of substantially 446 parts mono-barium silicate and barium sulphate to substantially 732 parts preformed dibarium silicate and calcining said mixture.

7. A composition of matter comprising a barium silicate, silicon-oxygen compound and a barium-yielding compound fusible at a temperature requisite to formation of said barium silicate, said silicon-oxygen compound and said barium-yielding compound being chemically uncombined.

In testimony whereof I have signed my name to this specification.

SERGE WITTOUCK.